United States Patent [19]

Kawamura

[11] Patent Number: 4,673,259
[45] Date of Patent: Jun. 16, 1987

[54] WIDE ANGLE LENS SYSTEM HAVING SHORT OVERALL LENGTH

[75] Inventor: Atsushi Kawamura, Yokosuka, Japan
[73] Assignee: Ricoh Company, Ltd., Tokyo, Japan
[21] Appl. No.: 838,836
[22] Filed: Mar. 12, 1986
[30] Foreign Application Priority Data
   Mar. 15, 1985 [JP] Japan ............... 60-50614
[51] Int. Cl.⁴ ................................. G02B 9/60
[52] U.S. Cl. ................................. 350/465
[58] Field of Search .............. 350/463–465
[56] References Cited
   U.S. PATENT DOCUMENTS
   3,516,734  6/1970  Schmidt ................. 350/465
   3,951,524  4/1976  Doi et al. ............... 350/465
   4,183,626  1/1980  Rogers .................. 350/465

Primary Examiner—John K. Corbin
Assistant Examiner—Scott J. Sugarman
Attorney, Agent, or Firm—Oblon, Fisher, Spivak, McClelland & Maier

[57] ABSTRACT

This invention relates to a wide angle lens system having small telephoto ratio. The strong curvature of a negative lens group arranged on the image side, which is the characteristic of the lens system of this type, is eased by composing the negative lens group as a doublet. This structure maintains the spacing between the front lens group and the rear lens group to be small.

The negative lens group on the image side comprises two negative meniscus lenses, which have surfaces having stronger curvature facing each other.

4 Claims, 4 Drawing Figures

WIDE ANGLE LENS SYSTEM HAVING SHORT OVERALL LENGTH

BACKGROUND OF THE INVENTION

1. Field of the Invention

This invention relates to a wide angle lens system having a short overall length, and more particularly to a bright wide angle lens system having a lens arrangement of a telephoto type.

2. Description of the Prior Art

Recently, a wide angle lens system whose telephoto ratio is small and having a lens arrangement of a telephoto type has been widely used as a photographic lens for a compact lens shutter camera.

In many examples, such a lens system as described above comprises a negative lens in the form of a single negative meniscus in the rear group. However, this lens system involves problems such as deterioration of aberrations at a deep concave surface and formation of a lens system into a larger size due to a large spacing between the front and rear groups.

The present applicant has previously proposed a lens system which can achieve an improvement of aberrations and miniaturization of the lens system while maintaining a small telephoto ratio and a wide field angle by composing the negative lens in the rear group as a doublet. (Japanese Patent Application No. 39,242/82)

SUMMARY OF THE INVENTION

It is an object of this invention to provide a high performance bright lens system having F number of about 2.8 which is obtained by further developing the idea in lens design previously proposed by the present applicant and which involves less variation in aberrations resulting from moving forward the front group, and less aberrations, particularly distortion.

A lens system according to this invention comprises five lenses consisting of a front group in the form of a triplet and a rear group of two negative lenses, the two negative lenses in the rear group being meniscus lenses with surfaces of stronger curvature facing each other, the lens system satisfying the following conditions:

$$0 < f_{1,2} \quad (1)$$

$$0.7 < |f_R|/f < 1 \quad (2)$$

$$35 < \nu_3 < 50 \quad (3)$$

$$-8 < r_8/r_9 < -4 \quad (4)$$

where
- $f$: focal length of the entire system
- $f_{1,2}$: combined focal length of a first and a second lenses from the object side
- $f_R$: focal length of the rear group
- $r_i$: radius of curvature of the $i^{th}$ surface from the object side
- $\nu_i$: Abbe's number of the $i^{th}$ lens from the object side.

The condition (1) relates to the power arrangement of the triplet of the front-group and is provided to minimize occurrence of aberrations. In prior art, in the triplet a great negative power is assigned to the second lens to decrease Petzval's sum so that divergent rays may incident upon the third lens, and therefore, $f_{1,2} < 0$ results. In this condition, occurrence of aberration is relatively large. In this invention, since the rear-group has the negative Petzval's sum, the convergent rays are caused to be incident upon the third lens to minimize a load of the third lens and to restrain occurrence of aberrations thus making it possible to provide a high degree of aberration correction.

The condition (2) is necessary to minimize the telephoto ratio to make the lens system compact. When the value is less than the lower limit of the condition (2), the power of the rear-group becomes too great so that it tends to produce coma in addition to positive distortion. When the value exceeds the upper limit, aberrations occurs less but the telephoto ratio cannot be minimized to make it impossible to make the lens compact.

The condition (3) is provided to remove paraxial chromatic aberration and chromatic aberration of magnification and at the same time to correct chromatic aberration of coma (difference by color). For rays passing through the peripheral edge of lenses in the front group and reaching the high field angle, the chromatic aberration of divergent coma occurs at the third surface. At that time, it is effective to decrease difference in color by arranging glass having a relatively large dispersion to the third lens and by producing chromatic aberration of a convergent coma at the sixth surface. If the value is less than the lower limit, the chromatic aberration of the coma is small but particularly correction of the paraxial chromatic aberration becomes impossible. Conversely, if the value exceeds the upper limit, the chromatic aberration of the coma is rendered impossible to make small.

The condition (4) is necessary to minimize the amount of spherical aberration of the rear-group by applying a restriction to the shape of an air lens contained in the rear-group. With this, when the front group is extended forward to adjust the focusing, a lens system having a small variation in spherical aberration may be obtained. Correction of the spherical aberration of the entire system may be caried out by providing spherical aberration of which signs are different but the amount is generally equal in the front and rear groups. And, if the amount of aberration of the respective groups is made to be small, the variation in aberration resulting from extending the front-group is decreased. When the value is less than the lower limit, the amount of spherical aberration of the rear-group cannot be decreased. When the value exceeds the upper limit, occurrence of astigmatism increases at the high field angle, thus making it impossible to provide a high performance.

DETAILED DESCRIPTION OF THE PREFERRED EMBODIMENTS

Embodiments of this invention will be specifically given hereinafter. In these embodiments, $f=100$, F number $=2.88$, field angle $2\omega = 62°$, $d_i$: length of an optical axis between the $i^{th}$ surface and the $(i+1)^{th}$ surface, and $n_i$: refractive index of d-line of the $i^{th}$ lens.

Figure 2:
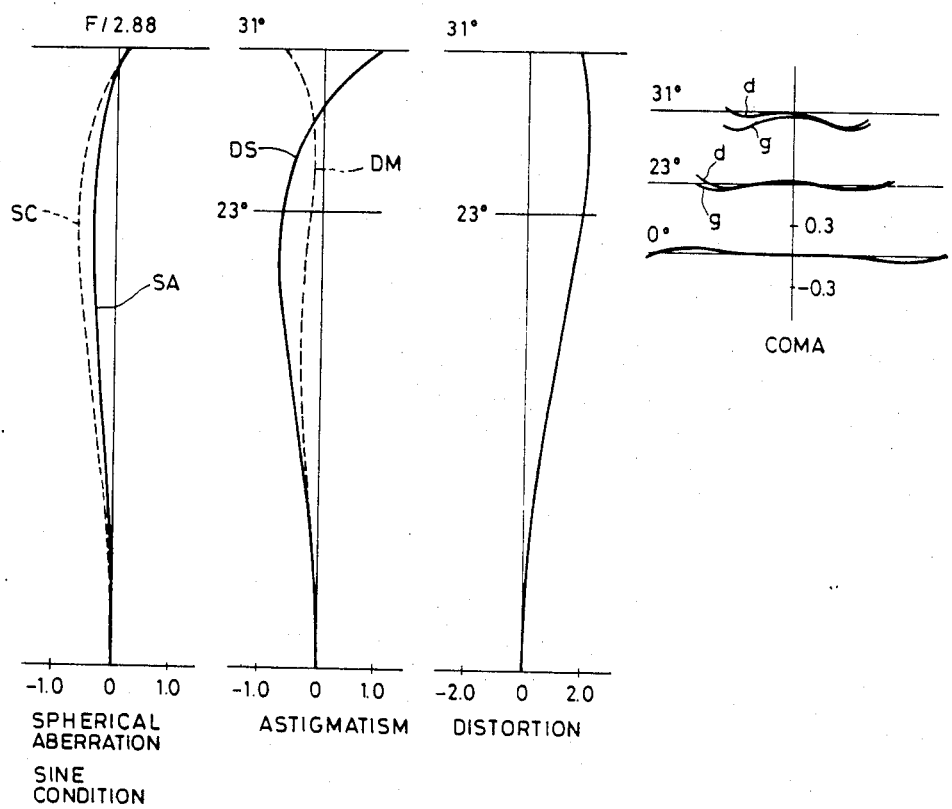
FIGS. 2, 3 and 4 show aberration curves of the first, the second and the third embodiments, respectively.

| Embodiment 1 Aberration Curves: FIG. 2 | | | |
|---|---|---|---|
| $r_1 = 33.795$ | $d_1 = 9.0$ | $n_1 = 1.713$ | $\nu_1 = 53.94$ |
| $r_2 = 100.845$ | $d_2 = 3.01$ | | |
| $r_3 = -123.955$ | $d_3 = 2.47$ | $n_2 = 1.7847$ | $\nu_2 = 26.06$ |
| $r_4 = 87.061$ | $d_4 = 10.68$ | | |
| $r_5 = 70.853$ | $d_5 = 8.97$ | $n_3 = 1.72$ | $\nu_3 = 42.02$ |
| $r_6 = -92.082$ | $d_6 = 6.84$ | | |
| $r_7 = 146.303$ | $d_7 = 4.1$ | $n_4 = 1.54072$ | $\nu_4 = 47.2$ |
| $r_8 = 99.512$ | $d_8 = 9.92$ | | |
| $r_9 = -21.515$ | $d_9 = 2.9$ | $n_5 = 1.72342$ | $\nu_5 = 37.99$ |
| $r_{10} = -33.135$ | | | |

Values of conditional formulae are:
(i) 508
(ii) 0.816
(iii) 47.2
(iv) −4.63

Figure 3:
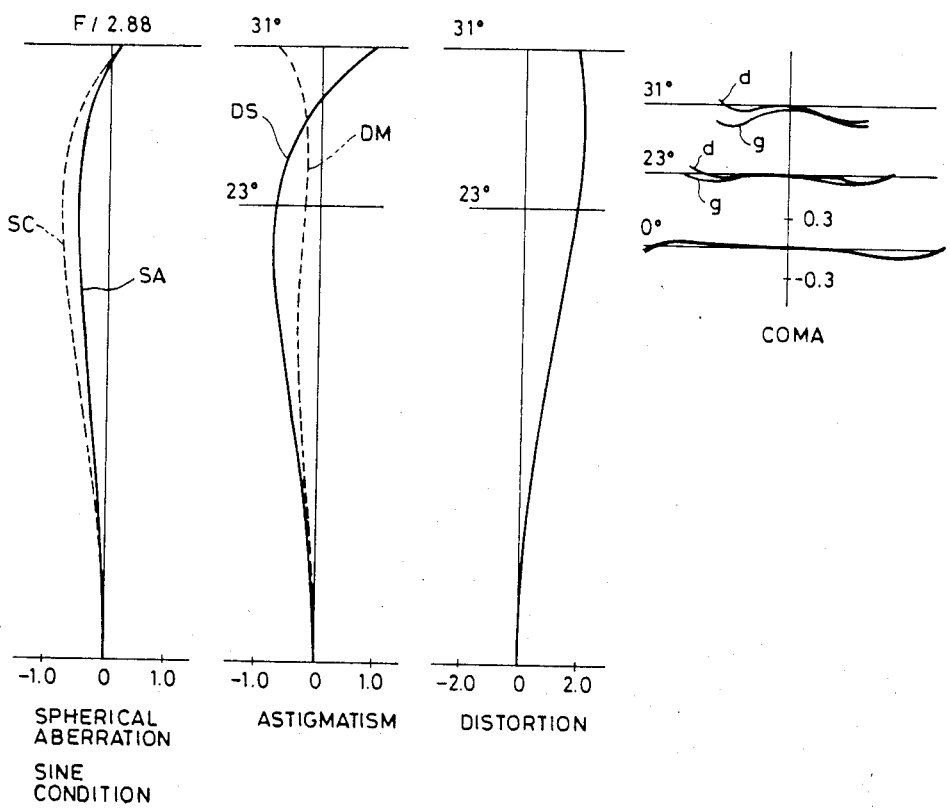

| Embodiment 2 Aberration Curves: FIG. 3 | | | |
|---|---|---|---|
| $r_1 = 32.453$ | $d_1 = 9.63$ | $n_1 = 1.6968$ | $\nu_1 = 55.46$ |
| $r_2 = 91.492$ | $d_2 = 3.3$ | | |
| $r_3 = -113.181$ | $d_3 = 2.68$ | $n_2 = 1.76182$ | $\nu_2 = 26.55$ |
| $r_4 = 78.635$ | $d_4 = 8.75$ | | |
| $r_5 = 69.954$ | $d_5 = 9.12$ | $n_3 = 1.72$ | $\nu_3 = 42.02$ |
| $r_6 = -86.288$ | $d_6 = 6.45$ | | |
| $r_7 = 160.176$ | $d_7 = 4.38$ | $n_4 = 1.53172$ | $\nu_4 = 48.84$ |
| $r_8 = 115.61$ | $d_8 = 9.43$ | | |
| $r_9 = -21.033$ | $d_9 = 2.7$ | $n_5 = 1.72$ | $\nu_5 = 42.02$ |
| $r_{10} = -31.58$ | | | |

Values of conditional formulae are:
(i) 768
(ii) 0.876
(iii) 48.84
(iv) −5.5

Figure 4:
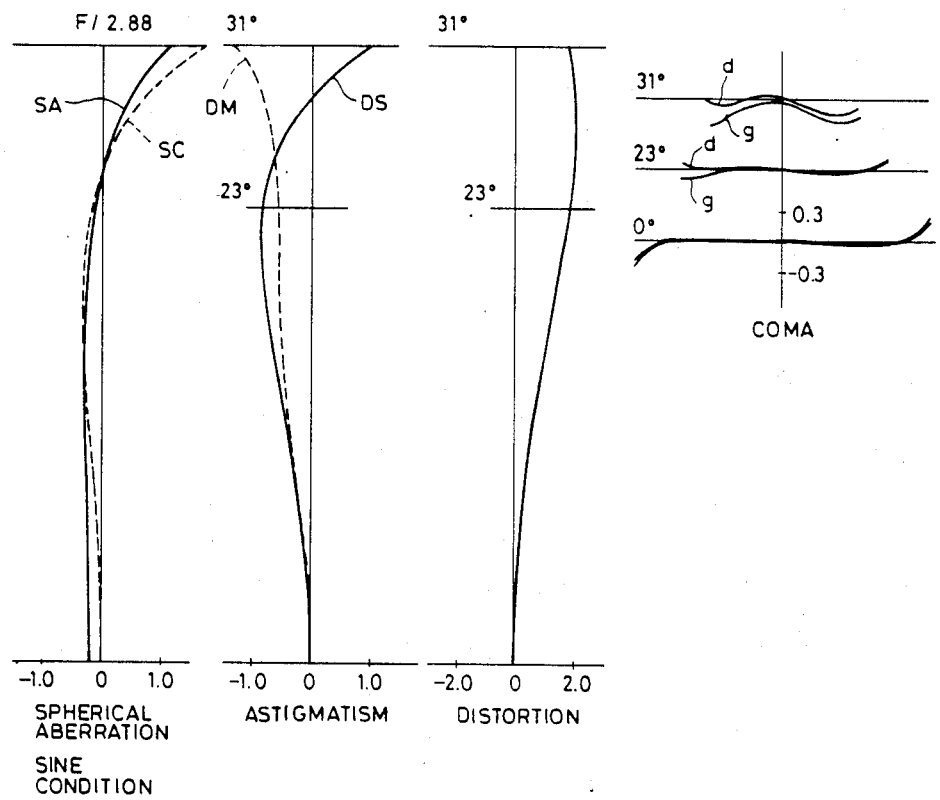

| Embodiment 3 Aberration Curves: FIG. 4 | | | |
|---|---|---|---|
| $r_1 = 32.591$ | $d_1 = 10.0$ | $n_1 = 1.713$ | $\nu_1 = 53.94$ |
| $r_2 = 101.43$ | $d_2 = 3.3$ | | |
| $r_3 = -120.476$ | $d_3 = 2.6$ | $n_2 = 1.78472$ | $\nu_2 = 25.7$ |
| $r_4 = 66.983$ | $d_4 = 8.5$ | | |
| $r_5 = 70.755$ | $d_5 = 8.65$ | $n_3 = 1.72342$ | $\nu_3 = 37.99$ |
| $r_6 = -84.593$ | $d_6 = 6.45$ | | |
| $r_7 = 159.862$ | $d_7 = 4.3$ | $n_4 = 1.58144$ | $\nu_4 = 40.89$ |
| $r_8 = 125.386$ | $d_8 = 9.5$ | | |
| $r_9 = -20.859$ | $d_9 = 2.9$ | $n_5 = 1.72342$ | $\nu_5 = 37.99$ |
| $r_{10} = -30.839$ | | | |

Values of conditional formulae are:
(i) 318
(ii) 0.929

-continued

| Embodiment 3 Aberration Curves: FIG. 4 |
|---|
| (iii) 37.99 |
| (iv) −6.01 |

Figure 1:
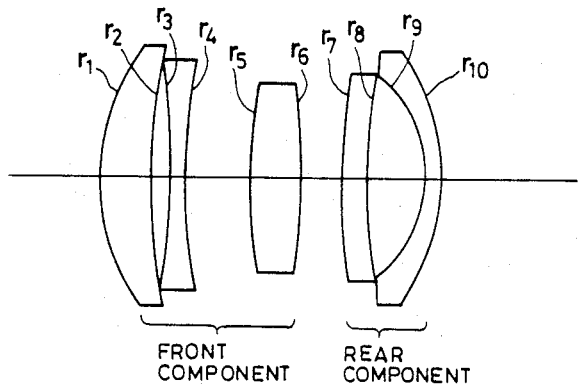
FIG. 1 is a sectional view showing the first embodiment of a lens system in accordance with this invention.

As shown in FIG. 1, a sectional view, and as can be seen from the embodiments, the lens system according to this invention is simple in construction and easily manufactured using only spherical surfaces, and yet, the telephoto ratio is small, approximately 1, F number is small and various aberrations are well corrected as shown in FIGS. 2 to 4.

What is claimed is:

1. A wide angle lens system having a short overall length comprising five lenses consisting of a front-group in the form of a triplet and a rear-group of two negative lenses, said two negative lenses in the rear-group being meniscus lenses with surfaces of stronger curvature facing each other, the wide angle lens system satistying the following conditions:

$$0 < f_{1,2}$$

$$0.7 < |f_R|/f < 1$$

where
f: focal length of the entire system
$f_{1,2}$: combined focal length of a first and a second lenses from an object side
$f_R$: focal length of the rear-group 2. The wide angle lens system according to claim 1, wherein said lens system satisfies the following condition:

$$35 < \nu_3 < 50$$

where
$\nu_i$: Abbe's number of the $i^{th}$ lens from the object side

3. The wide angle lens system according to claim 1, wherein said lens system satisfies the following condition:

$$-8 < r_8/r_9 < -4$$

where
$r_i$: radius of curvature of the $i^{th}$ surface from the object side

4. The wide angle lens system according to claim 2 wherein said lens system satisfies the following condition:

$$-8 < r_8/r_9 < -4.$$

* * * * *